(12) United States Patent
Ghirardi et al.

(10) Patent No.: US 6,533,293 B2
(45) Date of Patent: Mar. 18, 2003

(54) VEHICLE ATTITUDE CONTROL DEVICE AND RELATIVE OPERATING METHOD

(75) Inventors: Federico Ghirardi, Parama (IT); Alberto Longhi, Ferrara (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 09/915,767

(22) Filed: Jul. 27, 2001

(65) Prior Publication Data

US 2002/0024186 A1 Feb. 28, 2002

(30) Foreign Application Priority Data

Aug. 1, 2000 (IT) .......................... BOA000476

(51) Int. Cl.[7] ..................... B60G 17/01; B60G 17/005; B60G 23/00
(52) U.S. Cl. ...................................... 280/5.507; 701/38
(58) Field of Search ................ 701/37, 38; 280/5.5, 280/5.503–5.505, 5.507

(56) References Cited

U.S. PATENT DOCUMENTS 4,586,728 A 5/1986 Tokunaga et al.
5,475,596 A * 12/1995 Henry et al. ................. 701/37
5,941,920 A * 8/1999 Schubert ...................... 701/37

FOREIGN PATENT DOCUMENTS

EP 0 425 199 5/1991
FR 2 689 063 10/1993

* cited by examiner

*Primary Examiner*—Kevin Hurley
*Assistant Examiner*—Matthew Luby
(74) *Attorney, Agent, or Firm*—Shlesinger, Arkwright & Garvey LLP

(57) ABSTRACT

A device for controlling the attitude of a vehicle and having a number of electronically controlled shock absorbers and an electronic central control unit for driving the electronically controlled shock absorbers in such a manner as to regulate, instant by instant, the damping capacity of each; the electronic central control unit having a control circuit for determining when a gear shift is about to be made, a selection circuit for determining a shock absorber regulation strategy best suited to counteract the onset of attitude variations produced by the pending gear shift, and a shock absorber drive circuit for controlling the electronically controlled shock absorbers in such a manner as to implement the shock absorber regulation strategy selected by the selection circuit.

11 Claims, 3 Drawing Sheets

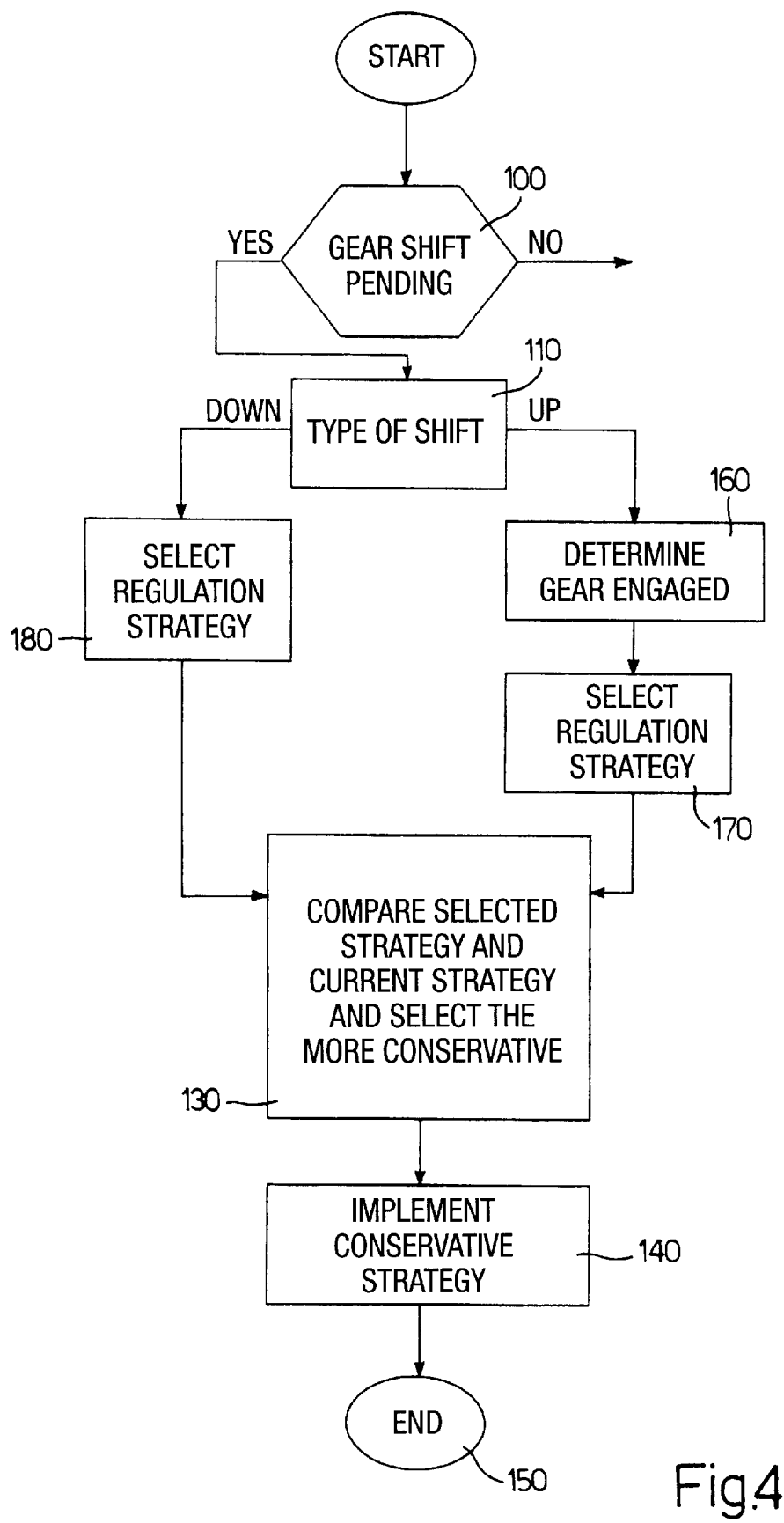

VEHICLE ATTITUDE CONTROL DEVICE AND RELATIVE OPERATING METHOD

The present invention relates to a vehicle attitude control device.

More specifically, the present invention relates to a device for controlling the attitude of a vehicle equipped with a robot-operated mechanical transmission, to which the following description refers purely by way of example.

BACKGROUND OF THE INVENTION

As is known, over the past few years, a sharp increase has been recorded in the number of vehicles equipped with robot-operated mechanical transmissions, i.e. a conventional mechanical transmission with a group of electrohydraulic actuators for shifting gear under the supervision of an electronic central control unit, which drives the electrohydraulic actuators controlling the clutch and gear shift control shafts so as to shift gear with no direct intervention on the part of the driver.

The electronic central control unit can operate either fully automatically, i.e. itself deciding independently when and how to shift gear; or manually, i.e. by performing the commands entered directly by the driver, after first determining they are mechanically compatible.

Unfortunately, unlike conventional automatic transmissions with a hydraulic torque converter, robot-operated mechanical transmissions of the above type, when effecting any gear shift, produce variations in the attitude of the vehicle, which, albeit of brief duration, may at times impair driving comfort. Such variations are caused by the necessity to release the clutch of the robot-operated mechanical transmission before effecting any gear shift, thus resulting in a sudden fall in the drive torque transmitted to the wheels, and in an unstable attitude of the vehicle. Like conventional mechanical transmissions, in fact, to effect any gear shift, robot-operated mechanical transmissions of the above type require a zero, or near-zero, drive torque at the input of the main transmission shaft.

More specifically, when effecting any gear shift, robot-operated mechanical transmissions of the above type temporarily alter the attitude of the vehicle, producing a longitudinal oscillating or so-called "pitching" movement which the driver finds particularly annoying, especially when the robot-operated mechanical transmission is operating in automatic. In automatic mode, in fact, gear shifting is controlled directly by the electronic central control unit of the transmission, so that the longitudinal oscillating movements of the vehicle occur one after another with no warning, i.e. without allowing the driver to prepare psychologically for the resulting variation in the attitude of the vehicle.

SUMMARY OF THE INVENTION

It is an object of the present invention to provide a vehicle attitude control device designed to improve the comfort of vehicles equipped with robot-operated mechanical transmissions by counteracting the onset of longitudinal oscillating movements when shifting gear.

According to the present invention, there is provided a vehicle attitude control device comprising a number of electronically controlled shock absorbers, and an electronic central control unit for driving said electronically controlled shock absorbers so as to regulate, instant by instant, the damping capacity of each; the attitude control device being characterized in that said electronic central control unit comprises control means for determining when a gear shift is about to be made; selecting means for determining a shock absorber regulation strategy best suited to counteract the onset of attitude variations produced by the pending gear shift; and shock absorber drive means for controlling the electronically controlled shock absorbers in such a manner as to implement the shock absorber regulation strategy selected by the selecting means.

The present invention also relates to a vehicle attitude control method.

According to the present invention, there is provided a method of controlling the attitude of a vehicle equipped with electronically controlled shock absorbers capable of varying damping capacity on command; the method being characterized by comprising the steps of determining the start of the gear shift procedure; selecting a shock absorber regulation strategy best suited to counteract the onset of attitude variations produced by the pending gear shift; and implementing said regulation strategy when shifting gear.

BRIEF DESCRIPTION OF THE DRAWINGS

A non-limiting embodiment of the present invention will be described by way of example with reference to the accompanying drawings, in which:

FIG. 4 shows a flow chart illustrating the operating method of the FIG. 1 attitude control device.

DETAILED DESCRIPTION OF THE INVENTION

Figure 1:
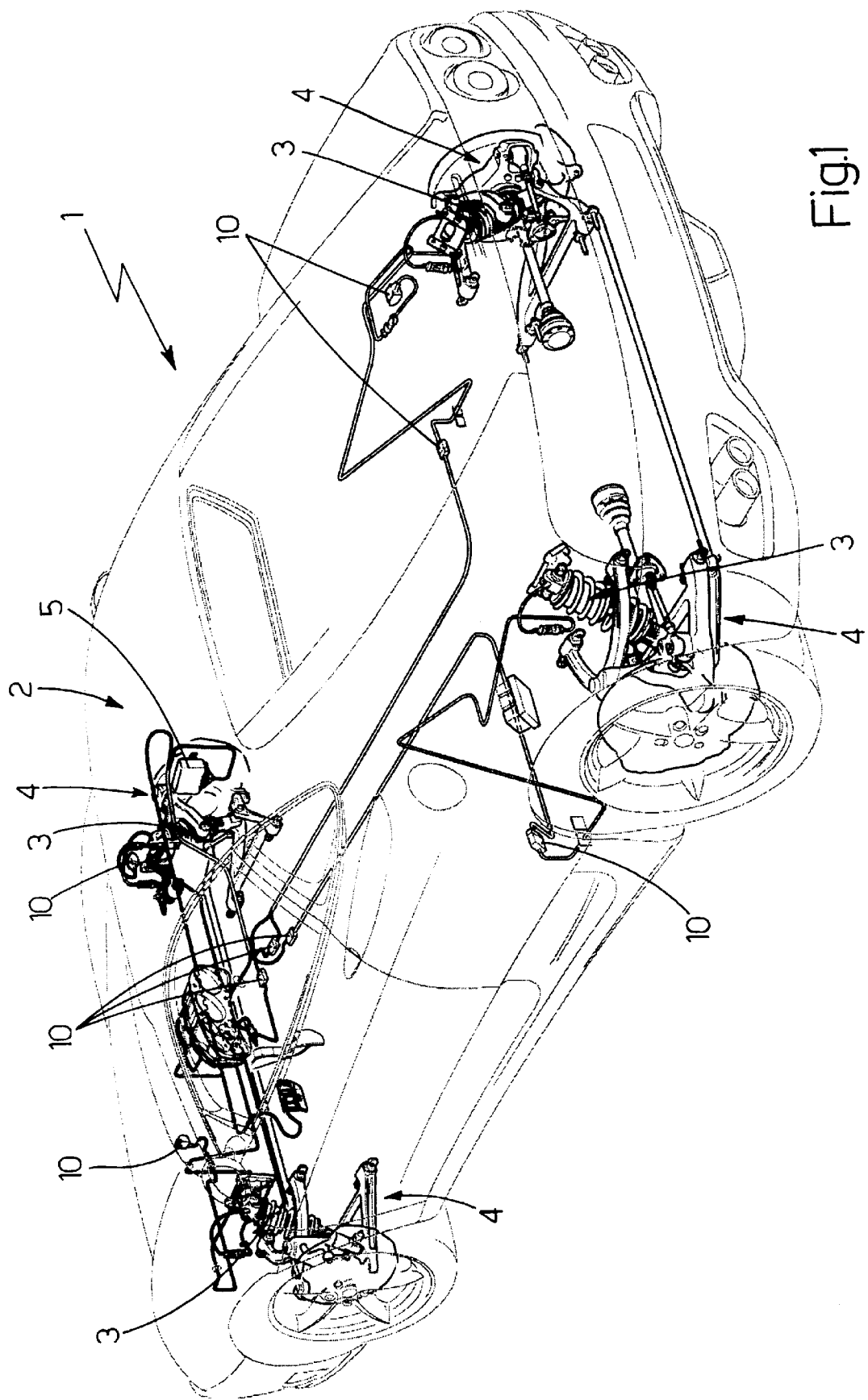
FIG. 1 shows a view in perspective, with parts removed for clarity, of a vehicle equipped with an attitude control device in accordance with the teachings of the present invention.

Number 1 in FIG. 1 indicates as a whole a vehicle attitude control device which can be installed, preferably though not necessarily, on vehicles 2 equipped with a known robot-operated mechanical transmission (not shown).

Attitude control device 1 comprises a number of electronically controlled shock absorbers 3 preferably, though not necessarily, integrated in the suspensions 4 of vehicle 2; and an electronic central control unit 5 for driving electronically controlled shock absorbers 3 so as to regulate, instant by instant, the damping capacity of each. More specifically, electronic central control unit 5 controls the damping capacity of electronically controlled shock absorbers 3 when making any gear shift, so as to prevent, by eliminating or at least minimizing, any shift-induced variations in attitude.

With reference to FIG. 1, in the particular example shown, vehicle 2 comprises four wheels, each connected to the vehicle body by a respective known four-bar-linkage suspension 4; and attitude control device 1 comprises four electronically controlled shock absorbers 3, each integrated in the spring-shock absorber assembly of a respective suspension 4. The spring-shock absorber assemblies are obviously known, and have a first end hinged to one of the movable elements of suspension 4—in the example shown, the bottom arm of suspension 4—and a second end hinged to the body of vehicle 2.

More specifically, in the example shown, each electronically controlled shock absorber 3 is defined by a known electronically controlled hydraulic shock absorber having at least one electrically controlled shutter valve (not shown) for regulating oil flow into the body of the shock absorber in known manner and so controlling its damping capacity.

Figure 2:
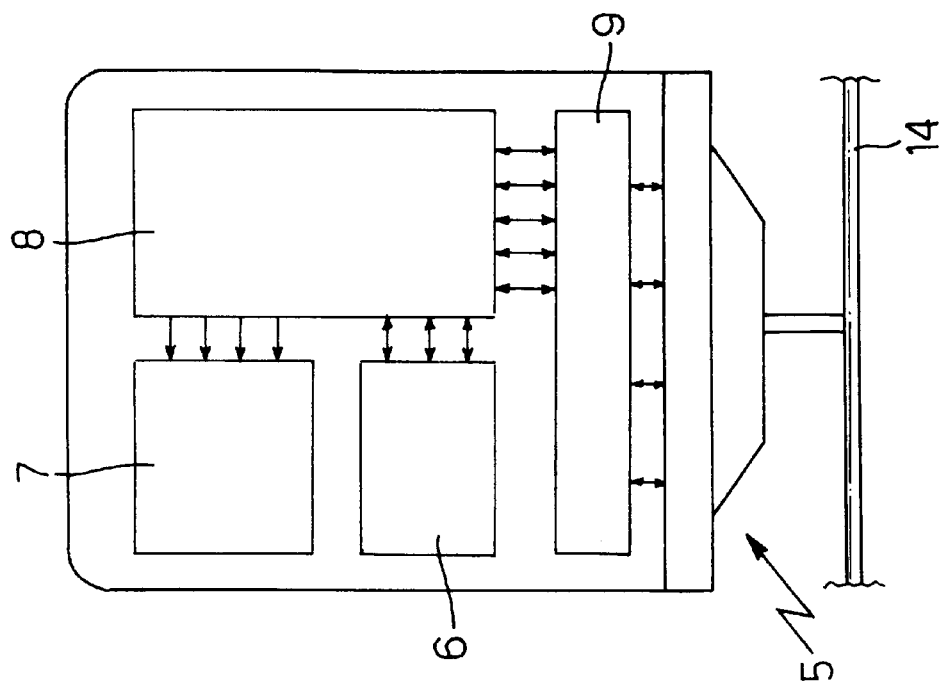
FIG. 2 shows, schematically, a component part of the FIG. 1 attitude control device.

With reference to FIG. 2, electronic central control unit 5 comprises: a control circuit 6 for determining when a gear shift is about to be made; a storage module 7 in which are memorized a number of regulation strategies by which to regulate the damping capacity of electronically controlled shock absorbers 3; a selection circuit 8 for determining, on the basis of the information detected by control circuit 6, the best shock absorber regulation strategy of all those memorized in storage module 7; and a shock absorber drive circuit 9 for controlling the shutter valve/s of each electronically controlled shock absorber 3 instant by instant, so as to implement the best shock absorber regulation strategy selected by selection circuit 8.

Preferably, though not necessarily, attitude control device 1 also comprises a given number of acceleration sensors 10 appropriately distributed on vehicle 2, and which provide for measuring, instant by instant, the values of the forces to which vehicle 2 is subjected when running, and for communicating said values to electronic central control unit 5, which is thus able to process and implement a regulation strategy by which to regulate the damping capacity of electronically controlled shock absorbers 3 and restore an optimum attitude of vehicle 2 as quickly as possible.

Figure 3:
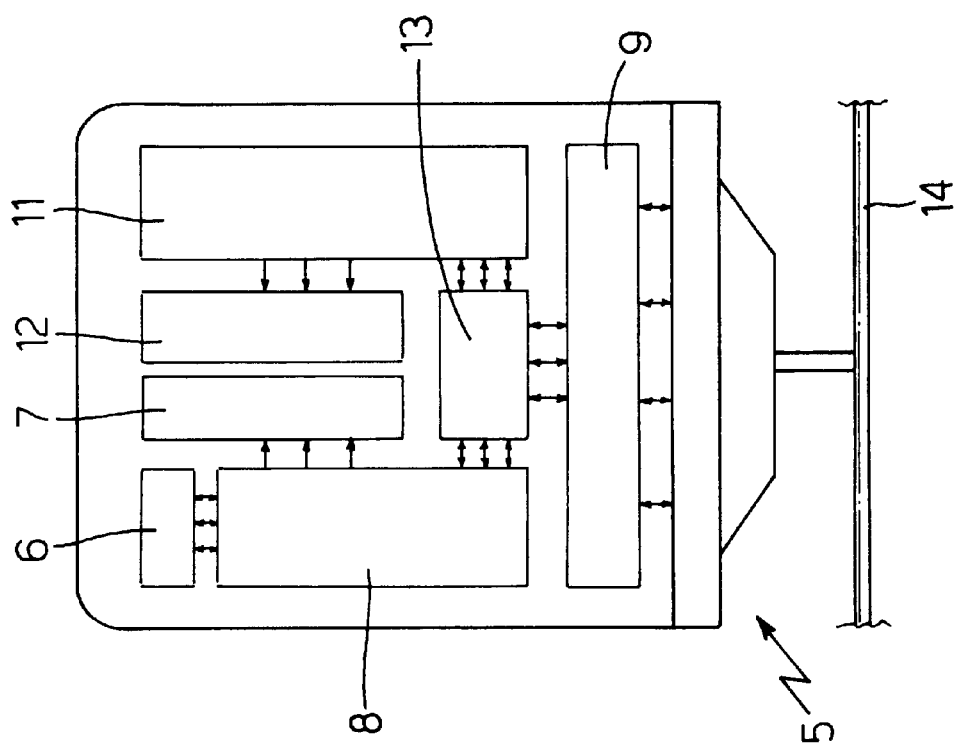
FIG. 3 shows, schematically, a variation of the FIG. 2 component part of the attitude control device.

More specifically, with reference to the FIG. 3 variation, electronic central control unit 5, in this case, also comprises a dynamic attitude control circuit 11 for analyzing the signals from acceleration sensors 10 instant by instant, and real-time processing a shock absorber regulation strategy capable of restoring the initial attitude of vehicle 2 as quickly as possible. The strategy may be selected from a number of shock absorber regulation strategies—in which case, electronic central control unit 5 comprises a second storage module 12 in which to memorize the strategies—or may be processed on the basis of a mathematical model of the performance of vehicle 2, also memorized in a second storage module 12.

In the FIG. 3 variation, electronic central control unit 5 also comprises a comparing circuit 13 for determining, instant by instant, which of the two shock absorber regulation strategies selected by selection circuit 8 and attitude control circuit 11 is the more conservative—i.e. provides for a greater damping capacity of electronically controlled shock absorbers 3—and for implementing said strategy via drive circuit 9.

Obviously, in the FIG. 3 variation, storage module 7 and selection circuit 8 of electronic central control unit 5 will only be activated when shifting gear, so as to prevent the onset of any shift-induced longitudinal oscillating movement; whereas attitude control circuit 11, second storage module 12, comparing circuit 13 and drive circuit 9 are active at all times, so as to restore an optimum attitude of vehicle 2 as quickly as possible following any change in the attitude of vehicle 2. Control circuit 6 is, obviously, also active at all times, so as to immediately determine the start of the gear shift procedure.

It should be pointed out that, in the first case, electronic central control unit 5 acts before and alongside gear shifting by the robot-operated mechanical transmission, to counteract the onset, or minimize at the outset the extent, of any shift-induced longitudinal oscillating movement.

In the second case, on the other hand, electronic central control unit 5 acts after any change in the attitude of vehicle 2 has taken place, be it a longitudinal oscillating movement, a transverse oscillating movement, or a combination of both, by driving electronically controlled shock absorbers 3 in such a manner as to restore an optimum attitude of vehicle 2 as quickly as possible.

In other words, in the first case, electronic central control unit 5 prevents the onset of any variation in the attitude of vehicle 2, and, in the second, counteracts the effects produced by any variation in the attitude of vehicle 2 and attempts to restore an optimum attitude of vehicle 2 as quickly as possible.

Preferably, though not necessarily, attitude control device 1 also comprises a manual operation selector (not shown) by which the driver of vehicle 2 can communicate the desired type of vehicle performance to electronic central control unit 5. More specifically, in the example shown, the manual selector allows the driver to choose between a standard drive mode, and a sport mode which provides for a more rigid vehicle attitude.

Operation of attitude control device 1 will now be described only as regards the operations performed by electronic central control unit 5 when shifting gear; the attitude control part of its operation when not shifting gear already being known.

Operation of attitude control device 1 will therefore be described assuming it comprises acceleration sensors 10, and that electronic central control unit 5 comprises attitude control circuit 11, second storage module 12 and comparing circuit 13.

Operation of attitude control device 1 will also be described assuming electronic central control unit 5 is connected to a known data transmission network 14 (CAN Bus) on vehicle 2. In which case, control circuit 6 monitors the control signals on data transmission network 14 in search of the control signal or sequence of control signals indicating the start of the gear shift procedure by the robot-operated mechanical transmission.

In actual use, electronic central control unit 5 operates by monitoring data transmission network 14 on vehicle 2, in search of the control signal or sequence of control signals indicating the start of the gear shift procedure by the robot-operated mechanical transmission.

At the same time, electronic central control unit 5 acquires the signals from acceleration sensors 10 to determine, instant by instant, the forces to which the vehicle is subjected, and, if necessary, processes the shock absorber regulation strategy best suited to restore an optimum attitude of vehicle 2 as quickly as possible.

On detecting the control signal or sequence of control signals predicting a gear shift, electronic central control unit 5 sequentially acquires a number of operating parameters of vehicle 2, such as the speed and/or drive torque of the engine; determines whether the gear shift is up or down; and selects, from the various shock absorber regulation strategies, the best one according to the type of gear shift, according to various vehicle operating parameters (such as the drive torque of the engine), and according to the type of attitude set by the driver.

Electronic central control unit 5 then compares the shock absorber regulation strategy selected to prevent the onset of any shift-induced variation in attitude, with the shock absorber regulation strategy possibly already being implemented to eliminate any other than shift-induced variations in attitude, and executes the more conservative of the two, i.e. the one providing for a greater damping capacity of electronically controlled shock absorbers 3.

After a predetermined time interval or on detecting completion of the gear shift procedure, electronic central control unit 5 interrupts the current shock absorber regulation strategy and again executes the shock absorber regulation strategy possibly already being performed, prior to shifting gear, to eliminate any other than shift-induced variations in attitude.

More specifically, with reference to the FIG. 4 flow chart, electronic central control unit 5 acquires the signals on data transmission network 14 of vehicle 2, in search of the control signal or sequence of control signals indicating commencement of the gear shift procedure by the robot-operated mechanical transmission (block 100).

If no control signal or sequence of control signals indicating commencement of the gear shift procedure is found on data transmission network 14 (NO output of block 100), electronic central control unit 5 continues executing the current shock absorber regulation strategy.

Conversely, if a control signal or sequence of control signals indicating commencement of the gear shift procedure is found on data transmission network 14 (YES output of block 100), electronic central control unit 5 performs the operations described below to counteract or at least minimize the onset of any shift-induced longitudinal oscillating movement.

More specifically, electronic central control unit 5 first determines, on the basis of various vehicle operating parameters, whether the gear shift is up or down (block 110), and then, in the case of a down shift (DOWN output of block 110), selects the best of the available shock absorber regulation strategies on the basis of various vehicle operating parameters (e.g. engine drive torque) and the type of attitude set by the driver (block 120).

Electronic central control unit 5 then compares the shock absorber regulation strategy currently being performed to eliminate other than shift-induced variations in attitude, with the shock absorber regulation strategy just selected to prevent the onset of any variations in attitude induced by the gear shift being performed, and selects the more conservative of the two, i.e. the strategy providing a greater damping capacity of electronically controlled shock absorbers 3 (block 130).

Finally, electronic central control unit 5 executes the more conservative shock absorber regulation strategy (block 140), and interrupts it after a predetermined time interval or on detecting completion of the gear shift procedure. At the end of the regulation strategy selected to counteract the effects of the gear shift, electronic central control unit 5 again executes the shock absorber regulation strategy being performed prior to shifting gear (block 150).

Conversely, in the event of an up shift (UP output of block 110), electronic central control unit 5 determines, on the basis of various vehicle operating parameters, which gear is currently engaged (block 160), and then selects the best of the available regulation strategies on the basis of the gear engaged, other vehicle operating parameters (e.g. engine drive torque), and the type of attitude set by the drive (block 170).

In this case, too, after selecting the best regulation strategy, electronic central control unit 5 compares the shock absorber regulation strategy just selected to prevent the onset of any variations in attitude induced by the gear shift being performed, with the shock absorber regulation strategy currently being performed to eliminate other than shift-induced variations in attitude, and selects the more conservative of the two, i.e. the strategy providing a greater damping capacity of electronically controlled shock absorbers 3 (block 130).

Finally, electronic central control unit 5 executes the more conservative shock absorber regulation strategy (block 140), and interrupts it after a predetermined time interval or on detecting completion of the gear shift procedure.

At the end of the regulation strategy selected to counteract the effects of the gear shift, electronic central control unit 5 again executes the shock absorber regulation strategy being performed prior to shifting gear (block 150).

The advantages of attitude control device 1 are obvious: any shift-induced variations in the attitude of vehicles 2 equipped with robot-operated mechanical transmissions are eliminated completely, thus improving driving comfort, by effectively regulating the damping capacity of the shock absorbers to counteract any variations even before they occur.

Attitude control device 1 as described and illustrated herein also has the advantage of being integrated easily and cheaply into known attitude control devices.

Clearly, changes may be made to attitude control device 1 and the operating method as described and illustrated herein without, however, departing from the scope of the present invention.

What is claimed is:

1. A vehicle attitude control device (1) comprising a number of electronically controlled shock absorbers (3), and an electronic central control unit (5) for driving said electronically controlled shock absorbers (3) so as to regulate, instant by instant, the damping capacity of each; the attitude control device (1) being characterized in that said electronic central control unit (5) comprises control means (6) for determining when a gear shift is about to be made; selecting means (8) for determining a shock absorber regulation strategy best suited to counteract the onset of attitude variations produced by the pending gear shift; and shock absorber drive means (9) for controlling the electronically controlled shock absorbers (3) in such a manner as to implement the shock absorber regulation strategy selected by the selecting means (8).

2. A vehicle attitude control device as claimed in claim 1, wherein said electronic central control unit (5) comprises storage means (7) in which are memorized a number of strategies by which to regulate the damping capacity of the electronically controlled shock absorbers (3); the selecting means (8) selecting the best strategy by which to regulate the electronically controlled shock absorbers (3) from those memorized in the storage means (7) and on the basis of various operating parameters of the vehicle (2).

3. A vehicle attitude control device as claimed in claim 2, characterized by comprising a number of sensors (10) for determining the values of the forces to which the vehicle (2) is subjected when running, and for communicating said values to the electronic central control unit (5).

4. A vehicle attitude control device as claimed in claim 3, wherein the electronic central control unit (5) comprises dynamic attitude control means (11) for analyzing the signals from said sensors (10) to process a shock absorber regulation strategy which, in the presence of variations in the attitude of the vehicle (2), is capable of restoring the initial attitude of the vehicle (2) as quickly as possible.

5. A vehicle attitude control device as claimed in claim 4, wherein the electronic central control unit (5) comprises comparing means (13) for determining which, of the regulation strategy selected by the selecting means (8) and the regulation strategy selected by the dynamic attitude control means (11), is the more conservative, and for implementing said strategy via the shock absorber drive means (9).

6. A vehicle attitude control device as claimed in claim 5, wherein the comparing means (13) determine which, of the regulation strategy selected by the selecting means (8) and the regulation strategy selected by the dynamic attitude control means (11), provides for the greater damping capacity of the various electronically controlled shock absorbers (3), and implement said strategy via the shock absorber drive means (9).

7. A vehicle attitude control device as claimed in claim 1, wherein said vehicle (2) is equipped with a robot-operated mechanical transmission.

8. A method of controlling the attitude of a vehicle (2) equipped with electronically controlled shock absorbers (3) capable of varying damping capacity on command; the method being characterized by comprising the steps of determining the start of the gear shift procedure; selecting a shock absorber regulation strategy best suited to counteract the onset of attitude variations produced by the pending gear shift; and implementing said regulation strategy when shifting gear.

9. A method as claimed in claim 8, wherein said step of selecting the best shock absorber regulation strategy comprises the step of determining the type of gear shift about to be performed.

10. A method as claimed in claim 9, wherein said step of selecting the best shock absorber regulation strategy comprises the step of selecting a shock absorber regulation strategy from a number of possible regulation strategies, on the basis of the type of gear shift about to be performed, and on the basis of other operating parameters of the vehicle (2).

11. A method as claimed in claim 10, wherein said step of selecting the best shock absorber regulation strategy comprises the step of comparing the shock absorber regulation strategy relative to the gear shift, with the shock absorber regulation strategy possibly already being implemented, and implementing the more conservative of the two.

* * * * *

UNITED STATES PATENT AND TRADEMARK OFFICE
CERTIFICATE OF CORRECTION

PATENT NO.    : 6,533,293 B2                                        Page 1 of 1
DATED         : March 18, 2003
INVENTOR(S)   : Ghirardi et al.

It is certified that error appears in the above-identified patent and that said Letters Patent is hereby corrected as shown below:

<u>Title page,</u>
Item [75], Inventors, in the inventor's city data, please replace "Parama" with
-- Parma --.
Item [30], Foreign Application Priority Data, replace "BOA000476" with
-- BO2000A000476 --.

Signed and Sealed this

Eleventh Day of November, 2003

JAMES E. ROGAN
*Director of the United States Patent and Trademark Office*